(12) United States Patent
Butscher et al.

(10) Patent No.: US 7,284,375 B2
(45) Date of Patent: Oct. 23, 2007

(54) DEVICE AND METHOD FOR THE CLOSED-LOOP CONTROL OF AN EXHAUST GAS TURBOCHARGER WITH VARIABLE TURBINE GEOMETRY

(75) Inventors: Franz Butscher, Friedrichshafen (DE); Stephan Uhl, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 60 days.

(21) Appl. No.: 11/172,470

(22) Filed: Jun. 30, 2005

(65) Prior Publication Data

US 2006/0026960 A1    Feb. 9, 2006

(30) Foreign Application Priority Data

Aug. 6, 2004    (DE) .................. 10 2004 038 156

(51) Int. Cl.
*F02B 33/44* (2006.01)
*F02B 37/00* (2006.01)
*F02B 37/24* (2006.01)
*F02B 37/22* (2006.01)
*F02B 37/12* (2006.01)
*F02D 23/00* (2006.01)

(52) U.S. Cl. .......................... 60/602; 60/612
(58) Field of Classification Search .......... 60/600–602, 60/612
See application file for complete search history.

(56) References Cited

U.S. PATENT DOCUMENTS

| | | | | |
|---|---|---|---|---|
| 5,123,246 A | * | 6/1992 | Younessi et al. ............. | 60/602 |
| 5,440,879 A | * | 8/1995 | Dellora ........................ | 60/602 |
| 6,161,383 A | * | 12/2000 | Aschner et al. ............... | 60/602 |
| 6,427,445 B1 | * | 8/2002 | Isaac et al. .................... | 60/602 |
| 6,510,691 B1 | * | 1/2003 | Schmid ......................... | 60/602 |
| 6,523,345 B2 | * | 2/2003 | Scherngell et al. ........... | 60/602 |
| 6,715,287 B1 | * | 4/2004 | Engel et al. ................... | 60/602 |
| 6,718,767 B1 |   | 4/2004 | Caddy ........................... | 60/602 |
| 6,883,318 B2 | * | 4/2005 | Warner et al. ................. | 60/602 |
| 6,928,817 B2 | * | 8/2005 | Ahmad ......................... | 60/602 |

FOREIGN PATENT DOCUMENTS

DE     697 12 056 T2     11/2002

* cited by examiner

*Primary Examiner*—Thai-Ba Trieu
(74) *Attorney, Agent, or Firm*—Klaus P. Stoffel; Wolff & Samson PC (57) ABSTRACT

A device and a method for closed-loop control of at least a first exhaust gas turbocharger with variable turbine geometry. In this regard, a first closed-loop control system is provided for automatically controlling the charge air pressure, and a second closed-loop control system is provided for automatically controlling the turbine speed. The second closed-loop control system is subordinate to the first closed-loop control system. The correcting variable (SG1) of the first closed-loop control system corresponds to the reference input of the second closed-loop control system.

25 Claims, 6 Drawing Sheets

DEVICE AND METHOD FOR THE CLOSED-LOOP CONTROL OF AN EXHAUST GAS TURBOCHARGER WITH VARIABLE TURBINE GEOMETRY

BACKGROUND OF THE INVENTION

The invention concerns a device and a method for the closed-loop control of an exhaust gas turbocharger with variable turbine geometry.

Exhaust gas turbochargers are used to boost the performance of internal combustion engines. The exhaust gas turbocharger can be better adapted to an operating point of the internal combustion engine by means of a variable turbine geometry, e.g., adjustable guide vanes. To guarantee constant setting accuracy, the exhaust gas turbocharger is operated in a closed-loop control system. In a closed-loop control system of this type, the exhaust gas turbocharger with variable turbine geometry is the controlled system. The actual charge air pressure is detected as the controlled variable and compared with the reference input, i.e., the set charge air pressure. A charge air pressure controller uses this control deviation to determine the correcting variable for acting on the controlled system. The correcting variable typically corresponds to the flow-through cross-sectional area of the turbine.

DE 697 12 056 T2 describes a control system for an exhaust gas turbocharger with variable turbine geometry. The control system comprises four closed-loop control systems arranged in parallel, namely, a first closed-loop control system for automatically controlling the exhaust gas pressure, a second closed-loop control system for automatically controlling the charge air pressure, a third closed-loop control system for automatically controlling the pressure difference between the exhaust gas pressure and the charge air pressure, and a fourth closed-loop control system for automatically controlling the turbine speed of the exhaust gas turbocharger. The four closed-loop control systems act on the same controlled system. During the operation of the internal combustion engine, only one of the closed-loop control systems is dominant, i.e., active, at any given time. The switching from one closed-loop control system to another closed-loop control system is event-controlled, e.g., as a function of a turbine speed limit or a braking mode. This control system conversion is complicated and allows automatic control of only a single controlled variable. The changes in dominance from one controller to another controller are likewise critical.

SUMMARY OF THE INVENTION

Therefore, the objective of the invention is to provide a simple and flexible automatic control device and an automatic control method for it.

For at least a first exhaust gas turbocharger with variable turbine geometry, the invention provides for an automatic control device that has a first closed-loop control system for automatically controlling the charge air pressure and a second closed-loop system for automatically controlling the turbine speed, such that the second closed-loop control system is subordinate to the first closed-loop control system. The first correcting variable of the first closed-loop control system thus corresponds to the reference input of the second closed-loop control system. The invention thus allows simultaneous automatic control of the charge air pressure and the turbine speed. In practice, the combustion peak pressure can be limited by the charge air pressure and at the same time the turbine speed.

Another advantage of the invention compared to the prior art consists in the fact that initialization of the active controller, especially its "I" component, is unnecessary, since both controllers are permanently active.

In one embodiment, a first input-output map and a second input-output map for computing the set charge air pressure and a two-way switch for selecting the first or second input-output map are provided. A fuel-optimized operating mode or a reaction-specific operating mode can be realized by means of the two input-output maps.

For a system with a first and second exhaust gas turbocharger, each with variable turbine geometry, the invention provides that a first or second synchronization controller or end of tape control block are installed, which are used to determine a third correcting variable for acting on the first exhaust gas turbocharger. The first synchronization controller computes the third correcting variable from the speed difference of the two turbine speeds. The second synchronization controller determines the third correcting variable from the difference of the air masses of the two compressors of the exhaust gas turbochargers. The end of tape control block determines the third correcting variable from the individual properties of the first exhaust gas turbocharger. All three measures serve the purpose of synchronous operation of the two exhaust gas turbochargers.

Other features and advantages of the present invention will become apparent from the following description of the invention which refers to the accompanying drawings.

DETAILED DESCRIPTION OF THE INVENTION

Figure 1:
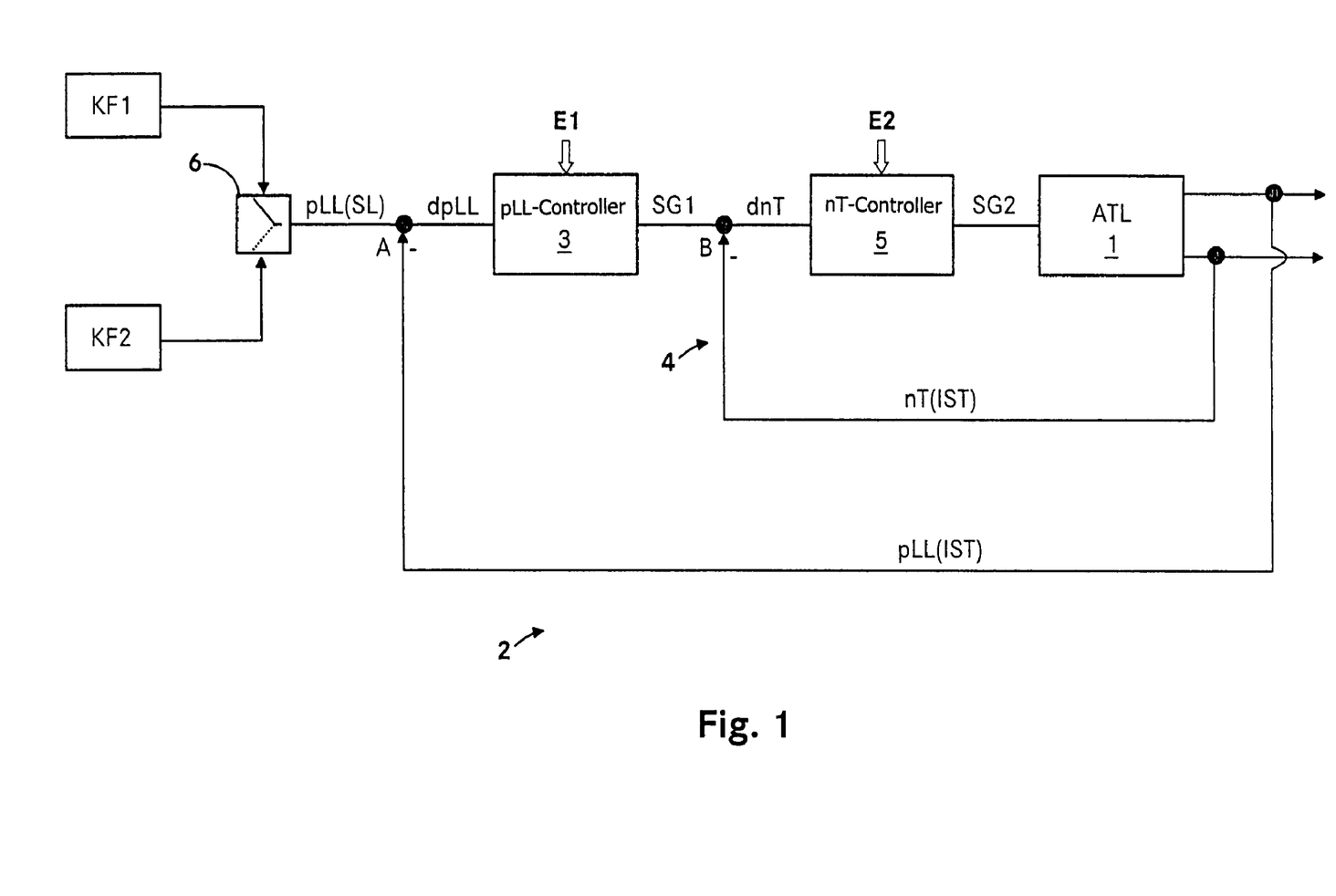
FIG. 1 shows a closed-loop control system with one exhaust gas turbocharger.

FIG. 1 shows a closed-loop control system with a first exhaust gas turbocharger. Hereinafter, the term "exhaust gas turbocharger" will be understood to mean an exhaust gas turbocharger with variable turbine geometry, e.g., adjustable guide devices. The automatic control device shown in FIG. 1 comprises a first closed-loop control system 2 for automatically controlling the charge air pressure and a second closed-loop control system 4 for automatically controlling the turbine speed of the first exhaust gas turbocharger 1. The second closed-loop control system 4 is subordinate to the first closed-loop control system 2. The input variable of the first closed-loop control system 2, i.e., the reference input, corresponds to a charge air pressure set value pLL(SL). The output variables, i.e., the controlled variables, of the two closed-loop control systems correspond to a charge air pressure actual value pLL(IST) and a turbine actual speed nT(IST). The charge air pressure set value pLL(SL) is preset by means of a first input-output map KF1 or a second input-output map KF2.

The turbine cross section is generally kept closed by the first input-output map KF1 in a steady-state engine operating point. The turbine speed and thus the charge air pressure are at a maximum for this operating point. This results in a reaction-specific operating mode (ready-to-go state) of the vehicle, since the charge air is already available to a great extent. The torque desired by a driver is spontaneously converted by the internal combustion engine with the exhaust gas turbocharger when a set point assignment is made by means of the first input-output map KF1.

In a steady-state engine operating point, the turbine cross section is selected in such a way by means of the second input-output map KF2 that the specific fuel consumption is minimized. This is not necessarily also the maximum turbine speed or the maximum charge air pressure. If the driver suddenly demands a higher torque, the turbine is accelerated from a lower speed level to a high level. The buildup of the maximum charge air pressure is correspondingly delayed. Therefore, the maximum torque desired by the driver at the actual engine speed is available only with a delay when a set point assignment is made by means of the second input-output map KF2.

At a point A, a control deviation dpLL is determined from the charge air pressure set value pLL(SL) and the charge air pressure actual value pLL(IST). A charge air pressure controller 3 computes a first correcting variable SG1 from the control deviation dpLL and an additional input variable E1. The internal structure of the charge air pressure controller 3 is explained in connection with FIG. 5. The first correcting variable SG1 corresponds to a turbine set speed. At a point B, the first correcting variable SG1 is compared with the turbine actual speed nT(IST). This results in a control deviation dnT. A turbine speed controller 5 determines a second correcting variable SG2 from the control deviation dnT and an additional input variable E2. The internal structure of the turbine speed controller 5 is explained in connection with FIG. 6. The second correcting variable SG2 represents the flow-through turbine cross section of the first exhaust gas turbocharger 1. The second correcting variable SG2 is supplied to the controlled system, i.e., the first exhaust gas turbocharger 1. In practice, the controlled system can additionally have an integrated guide vane position control system. The output variables of the controlled system, i.e., the charge air pressure actual value pLL(IST) and the turbine actual speed nT(IST) are fed back to the points A and B, respectively. The closed-loop control systems are thus closed.

The device illustrated in FIG. 1 allows automatic control of the charge air pressure and at the same time automatic control of the turbine speed. The charge air pressure controller 3 and the turbine speed controller 5 are permanently active. Therefore, switching strategies and transition initializations of the two controllers are unnecessary. The adjustment expense is significantly reduced in this way.

Figure 2:
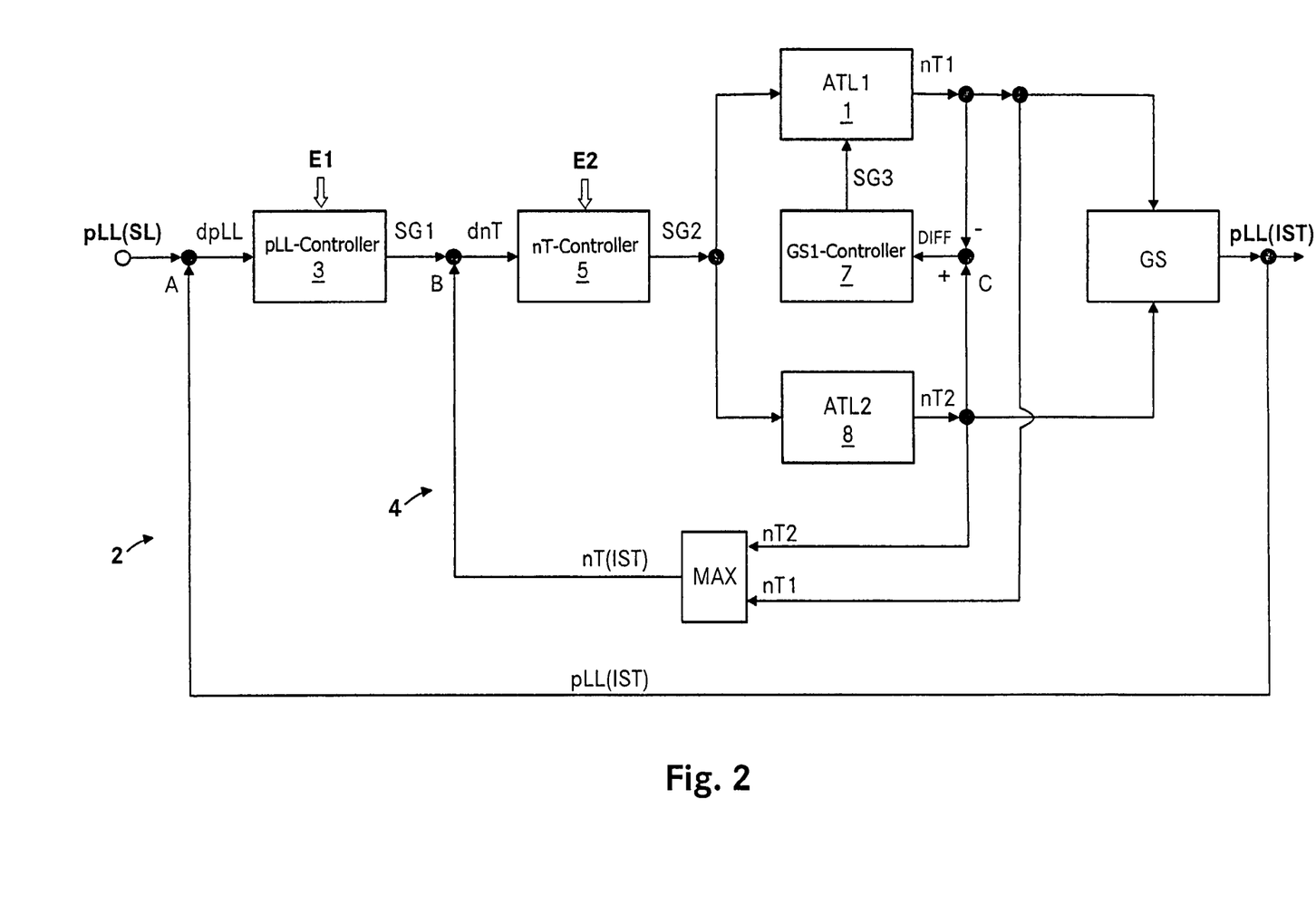
FIG. 2 shows a closed-loop control system with two exhaust gas turbochargers and a first synchronization controller.

FIG. 2 shows a closed-loop control system with two parallel exhaust gas turbochargers and a first synchronization controller 7. In practice, the two exhaust gas turbochargers can have an integrated position control system (not shown). The closed-loop control system consists of the first closed-loop control system 2 for automatically controlling the charge air pressure and the subordinate second closed-loop control system 4 for automatically controlling the turbine speeds. The input variable, i.e., the reference input, of the first closed-loop control system corresponds to the charge air pressure set value pLL(SL), which is determined, as described in connection with FIG. 1, by means of the first input-output map KF1 or the second input-output map KF2. The two input-output maps and the switch 6 are omitted from the drawing in FIG. 2. The output variable of the first closed-loop control system 2 corresponds to the charge air pressure actual value pLL(IST). At a summing point A, the control deviation dpLL is computed from the difference of the charge air pressure set value pLL(SL) from the charge air pressure actual value pLL(IST). The charge air pressure controller 3 computes the first correcting variable SG1 from the control deviation dpLL and an additional input variable E1. The first correcting variable SG1 corresponds to a turbine set speed, which corresponds to the reference input of the second closed-loop control system 4. At a point B, the control deviation dnT is computed from the difference of the first correcting variable SG1 from the turbine actual speed nT(IST). The turbine speed controller 5 determines the second correcting variable SG2 from the control deviation dnT and an additional input variable E2. The second correcting variable SG2 represents the flow-through turbine cross section. The second correcting variable SG2 acts on the first exhaust gas turbocharger 1 and the second exhaust gas turbocharger 8. The output variable of the first exhaust gas turbocharger 1 corresponds to a first turbine speed nT1. The output variable of the second exhaust gas turbocharger 8 corresponds to a second turbine speed nT2. The two turbine speeds nT1 and nT2 are compared at a point C. The resulting difference DIFF corresponds to the input variable of the first synchronization controller 7. The first synchronization controller 7 computes a third correcting variable SG3 as a function of this difference DIFF. The third correcting variable SG3 acts on the first exhaust gas turbocharger 1. Synchronization of the two exhaust gas turbochargers 1 and 8 with respect to their turbine speeds is effected via the feedback path point C, first synchronization controller 7 and third correcting variable SG3.

The output variable of the first exhaust gas turbocharger 1, the first turbine speed nT1, and the output variable of the second exhaust gas turbocharger 8, the second turbine speed nT2, are supplied to a maximum value selector MAX. Either the first turbine speed nT1 or the second turbine speed nT2 is set as the turbine actual speed nT(IST) by the maximum value selector MAX. The turbine actual speed nT(IST) is fed back to point B. The second closed-loop control system 4 is thus closed.

The output variable of the first exhaust gas turbocharger 1, the first turbine speed nT1, and the output variable of the second exhaust gas turbocharger 8, the second turbine speed nT2, are also supplied to a transfer function GS. The transfer function GS represents the combination of the two air mass flows of the first exhaust gas turbocharger 1 and the second exhaust gas turbocharger 8. The output variable of the transfer function GS corresponds to the charge air pressure actual value pLL(IST), which is fed back to point A. Thus, the first closed-loop control system 2 is also closed.

Figure 3:
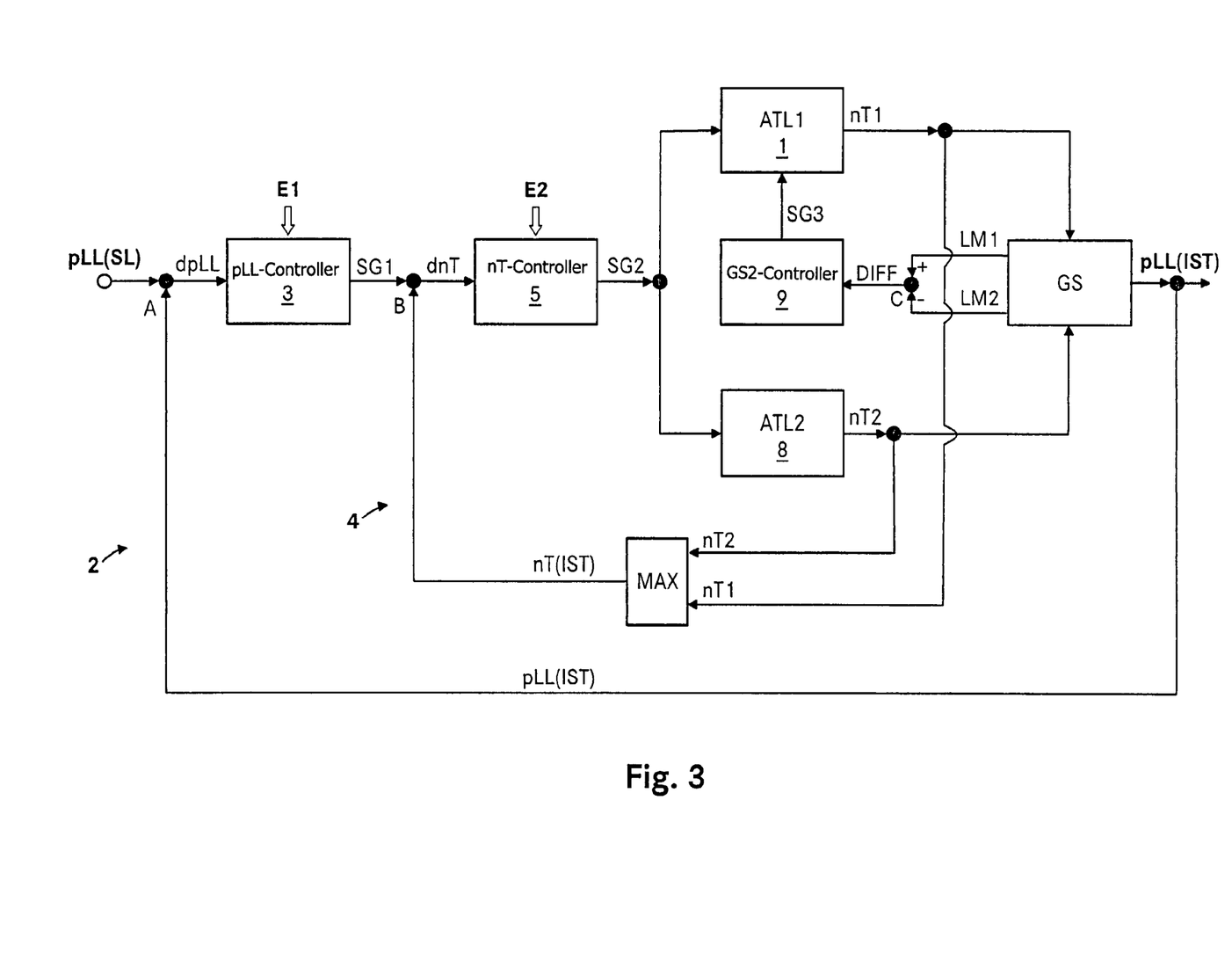
FIG. 3 shows a closed-loop control system with two exhaust gas turbochargers and a second synchronization controller.

FIG. 3 shows a closed-loop control system with two exhaust gas turbochargers and a second synchronization controller 9. In contrast to FIG. 2, the third correcting variable GS3 for acting on the first exhaust gas turbocharger 1 is determined by means of the second synchronization controller 9. As input variables, the second synchronization controller 9 receives a difference DIFF, point C, between a first air mass LM1 and a second air mass LM2 by means of the transfer function GS. The first exhaust gas turbocharger 1 and the second exhaust gas turbocharger 8 are synchronized with respect to their air masses by the second synchronization controller 9. The first closed-loop control system 2 and the second closed-loop control system 4 otherwise function as described in connection with FIG. 2.

Figure 4:
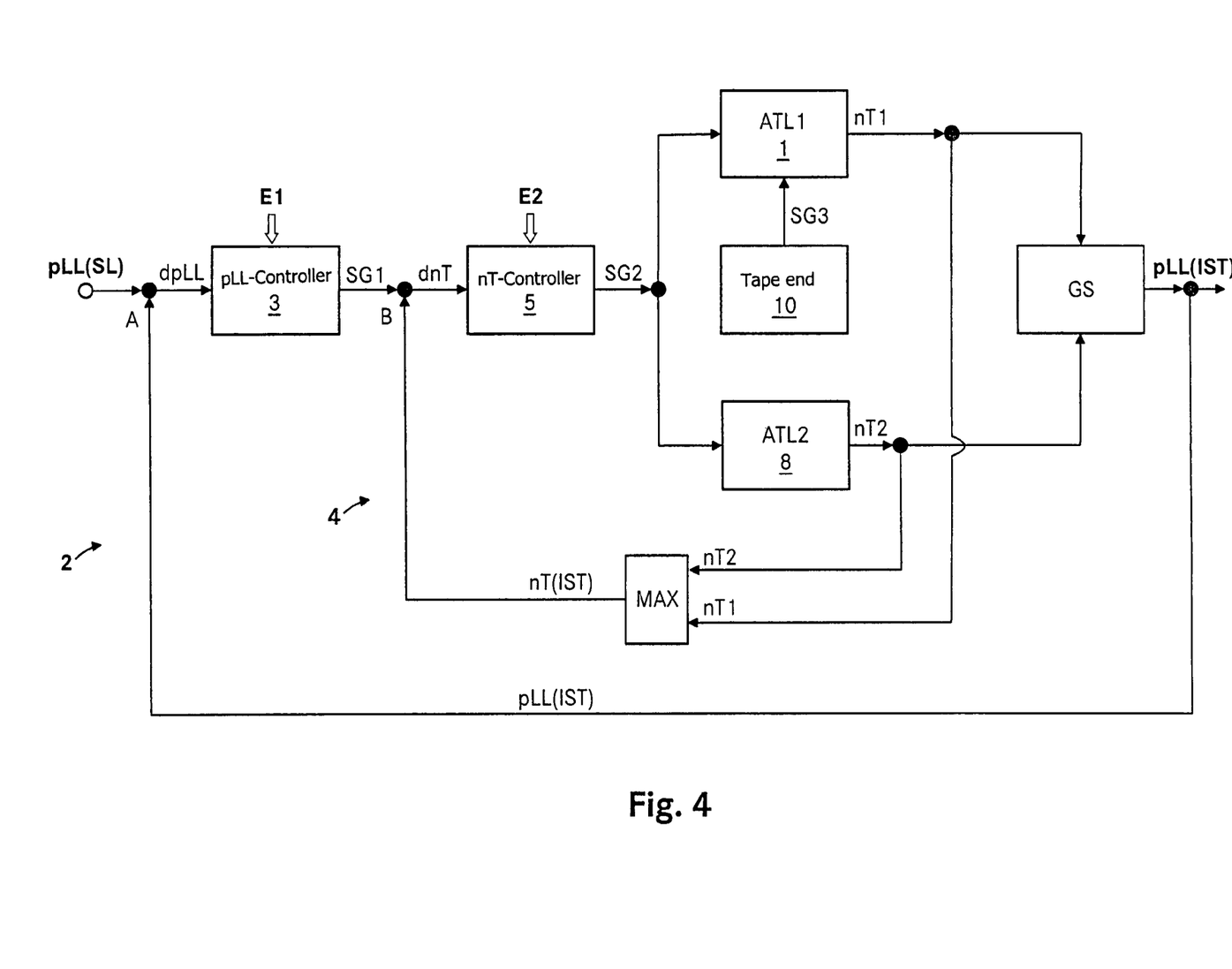
FIG. 4 shows a closed-loop control system with two exhaust gas turbochargers and a end of tape control block.

FIG. 4 shows a closed-loop control system with two exhaust gas turbochargers and a end of tape control block 10. The third correcting variable SG3 for acting on the first exhaust gas turbocharger 1 is determined by the end of tape control block 10. The individual characteristics of the first exhaust gas turbocharger 1 are mapped in the end of tape control block 10. The end of tape control block 10 also performs the function of synchronizing the two exhaust gas turbochargers 1 and 8. The first closed-loop control system 2 and the second closed-loop control system 4 otherwise function as described in connection with FIG. 2.

Figure 5:
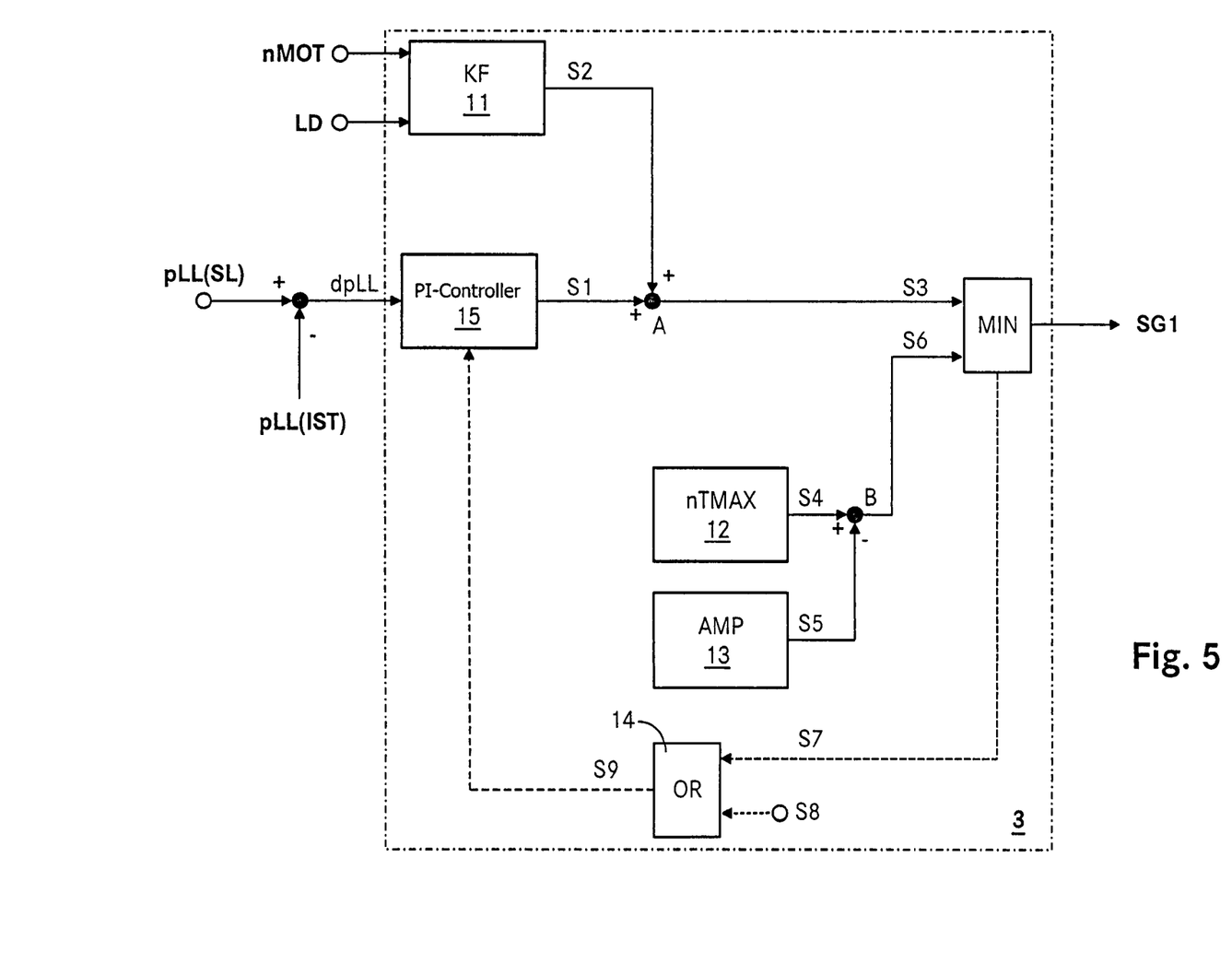
FIG. 5 shows a charge air pressure controller.

FIG. 5 shows the internal structure of the charge air pressure controller 3. The input variables are: the control deviation dpLL, an engine speed nMOT, and an engine load LD. The engine speed nMOT and the engine load LD correspond to the input variable E1 shown in FIGS. 1 to 4. The output variable of the charge air pressure controller 3 is the first correcting variable SG1, which represents a turbine set speed. The charge air pressure controller 3 comprises a PI controller 15, an input-output map input control 11, functional blocks 12 and 13, a minimum value selector MIN and a functional block 14 (OR gate). A signal S1 is determined from the control deviation dpLL by the PI controller 15. The PI controller 15 is dynamically supported by the input-output map input control 11. The input control values are obtained on the test stand during the determination of the charge air pressure set values for the various operating points by also storing the turbine speeds that arise during this determination in an additional input-output map (as a function of engine speed and engine load). This input-output map, which is typical of a specific exhaust gas turbocharger, is determined with the first input-output map KF1 and the second input-output map KF2 activated. In this way, during an operating point change, the turbine set speed value associated with the new operating point is immediately available. The function of the PI controller 15 is thus reduced to the elimination of disturbances that would occur with the input control alone without automatic control. Thus, e.g., with increasing operating level, the I component will compensate the then too low turbine set speed and raise it to a maximum turbine set speed.

At a point A, the signal S1 and the signal S2, which is computed by the input-output map input control 11, are added. This corresponds to the signal S3, which constitutes an input variable of the minimum value selector MIN. A maximum turbine speed nTMAX is predetermined by the functional block 12 (signal S4). In practice, this can be, e.g., 85,000 rpm. A maximum oscillation amplitude AMP of the turbine speed, e.g., 100 rpm, is predetermined by the functional block 13 (signal S5). The two signals S4 and S5 are compared at a point B. The resulting difference corresponds to the signal S6, which constitutes an input variable of the minimum value selector MIN. The output variable of the minimum value selector MIN, i.e., the first correcting variable SG1, thus has the value of the signal S3 or the signal S6.

To prevent the I component of the PI controller 15 from increasing uncontrollably, even though the first correcting variable SG1 is already at a maximum, a limit (antiwindup) is provided for the I component. The first correcting variable SG1 (turbine set speed) of the charge air pressure controller 3 is limited to a maximum value. The second correcting variable SG2 (turbine cross section) of the turbine speed controller 5 is limited both to a maximum and a minimum set turbine cross section. If one of the two correcting variables is now at the action limit stop, the I component is retained during this time. This allows increased dynamics of the cascade control system with the same robustness of the automatic control concept. In FIG. 5, the limitation of the I component is shown with broken lines. To this end, a signal S7 and a signal S8 are supplied to the functional block 14. The signal S7 represents the information that the first correcting variable SG1 is already at a maximum. The signal S8 represents the information that the second correcting variable SG2 is either at a minimum or a maximum. The output variable of the functional block 14, signal S9, is then supplied to the PI controller 15.

Figure 6:
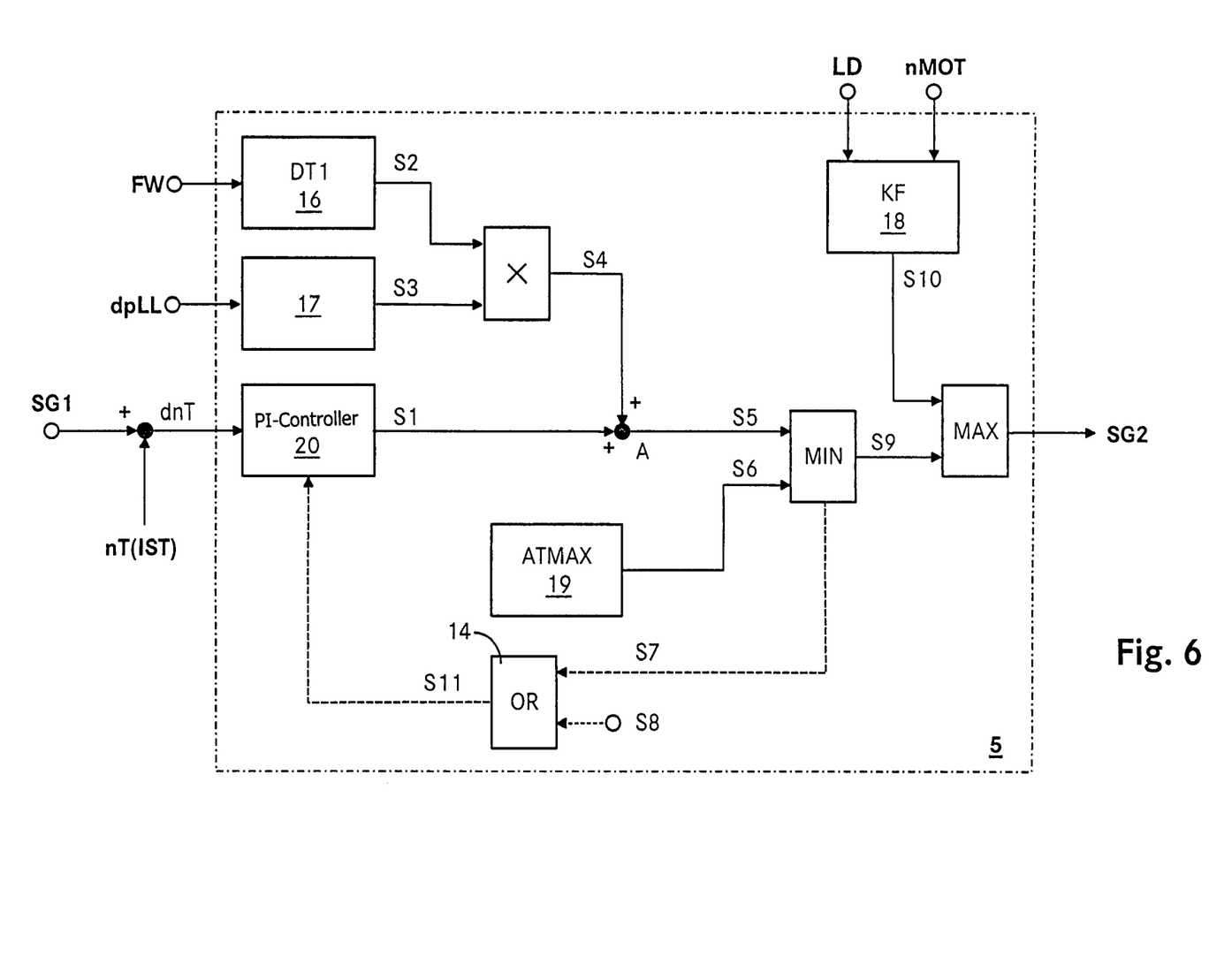
FIG. 6 shows a turbine speed controller.

FIG. 6 shows the internal structure of the turbine speed controller 5. The input variables of the turbine speed controller are: the control deviation dnT of the turbine actual speed nT(IST) from the first correcting variable SG1 (turbine set speed), a driver wish FW, the control deviation dpLL of the charge air pressure set value from the charge air pressure actual value, the engine load LD, and the engine speed nMOT. The driver wish FW, the control deviation dpLL, the engine load LD, and the engine speed nMOT correspond to the input variable E2 shown in FIGS. 1 to 4. The output-variable of the turbine speed controller 5 is the second correcting variable SG2, which corresponds to a flow-through turbine cross section.

The turbine speed controller 5 contains the following structural components: a PI controller 20, a DT1 input control 16, a charge air pressure input control 17, a surge protection input-output map 18, a functional block 19 for determining a maximum cross-sectional area, and the functional block 14 (OR gate). A signal S1 is determined by the PI controller 20 from the control deviation dnT of the turbine speeds. The PI controller 20 is dynamically supported by the DT1 input control 16. For this purpose, a driver wish gradient is formed from the driver wish FW and used for faster closing of the turbine cross section. In the case of acceleration, this builds up the charge pressure as quickly as possible. To prevent the turbine cross section from being closed unnecessarily when the set charge pressure has been reached and the driver wish gradient is available, this driver wish-dependent DT1 input control 16 (signal S2) is additionally multiplicatively weighted by the charge air pressure input control 17 (signal S3). The result corresponds to the signal S4. This guarantees that, when the charge pressure is too high, i.e., the charge pressure control deviation dpLL is less than zero, the gradient is not taken into consideration, and when the charge pressure is too low, i.e., the charge pressure control deviation dpLL is greater than zero, the gradient is taken into consideration to an increasing extent with increasing charge air control deviation.

The signal S1 and the signal S4 are added at a point A. This yields a signal S5, which represents an input variable of a minimum value selector MIN. A maximum cross-sectional area ATMAX is determined by the functional block 19 (signal S6). The signal S6 corresponds to an input variable of the minimum value selector MIN. Consequently, the signal S5 is limited to the value S6 by the minimum value selector MIN. The output variable of the minimum value selector MIN corresponds to the signal S9, which is supplied to a maximum value selector MAX. A signal S10 is supplied to the maximum value selector MAX as a second variable. The signal S10 is determined by the surge protection input-output map 18 as a function of the engine load LD and the engine speed nMOT. The output variable of the maximum value selector MAX corresponds to the second correcting variable SG2.

The surge protection input-output map 18 has the following function:

Whereas surge can be avoided during steady-state operation by suitable selection of the charge air set pressure, in nonsteady-state operation it cannot be ruled out that surge will occur in individual operating points if these operating points are operated with certain turbine cross sections. For this reason, the turbine cross section is not completely closed in all operating points in nonsteady-state operation. The impermissible cross sections are stored in the surge protection input-output map 18. Since the turbine operating point relevant for surge always follows the engine operating point with a time delay, the surge protection input-output map 18, with the dynamics resulting from the turbine moment of inertia, charge air column volume and control element also time-delayed, is taken into consideration in the limitation of the turbine cross section.

As has already been described in connection with FIG. 5, the turbine speed controller 5 contains a feedback path with a functional block 14 (OR gate) for limiting the I component of the PI controller 20. The functionality of this limitation is the same as described in connection with FIG. 5.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for closed-loop control of at least a first exhaust gas turbocharger with variable turbine geometry, comprising the steps of: automatically controlling charge air pressure by means of a first closed-loop control system, which has a charge air pressure controller that determines a first correcting variable (SG1) for influencing a flow-through turbine cross section from a deviation (dpLL) of an actual charge air pressure value from a set charge air pressure value; and automatically controlling turbine speed by means of a second closed-loop control system, which has a turbine speed controller that determines a second correcting variable (SG2) for influencing the flow-through turbine cross section (AT) from a deviation (dnT) of an actual turbine speed value from a set turbine value, the second closed-loop control system being subordinate to the first closed-loop control system, and a reference input of the second closed-loop control system being determined from the first correcting variable (SG1), including computing a third correcting variable (SG3) for synchronizing the first exhaust gas turbocharger and a second exhaust gas turbocharger with variable turbine geometry from a difference (DIFF) of turbine speeds (nT1, nT2), by means of a first synchronization controller.

2. The method in accordance with claim 1, wherein the flow-through turbine cross section of the first exhaust gas turbocharger is substantially determined by the second correcting variable (SG2) and the third correcting variable (SG3).

3. The method in accordance with claim 1, including determining the turbine actual speed (nT(IST)) for the second closed-loop control system from a maximum turbine speed of the first exhaust gas turbocharger or the second exhaust gas turbocharger.

4. A method for closed-loop control of at least a first exhaust gas turbocharger with variable turbine geometry, comprising the steps of: automatically controlling charge air pressure by means of a first closed-loop control system, which has a charge air pressure controller that determines a first correcting variable (SG1) for influencing a flow-through turbine cross section from a deviation (dpLL) of an actual charge air pressure value from a set charge air pressure value; and automatically controlling turbine speed by means of a second closed-loop control system, which has a turbine speed controller that determines a second correcting variable (SG2) for influencing the flow-through turbine cross section (AT) from a deviation (dnT) of an actual turbine speed value from a set turbine value, the second closed-loop control system being subordinate to the first closed-loop control system, and a reference input of the second closed-loop control system being determined from the first correcting variable (SG1), including computing a third correcting variable (SG3) for synchronizing the first exhaust gas turbocharger and a second exhaust gas turbocharger from a difference (DIFF) of air masses (LM1, LM2) of the first exhaust gas turbocharger and the second exhaust gas turbocharger, by means of a second synchronization controller.

5. The method in accordance with claim 4, wherein the flow-through turbine cross section of the first exhaust gas turbocharger is substantially determined by the second correcting variable (SG2) and the third correcting variable (SG3).

6. The method in accordance with claim 1, including determining the turbine actual speed (nT(IST)) for the second closed-loop control system from a maximum turbine speed of the first exhaust gas turbocharger or the second exhaust gas turbocharger.

7. A method for closed-loop control of at least a first exhaust gas turbocharger with variable turbine geometry, comprising the steps of: automatically controlling charge air pressure by means of a first closed-loop control system, which has a charge air pressure controller that determines a first correcting variable (SG1) for influencing a flow-through turbine cross section from a deviation (dpLL) of an actual charge air pressure value from a set charge air pressure value; and automatically controlling turbine speed by means of a second closed-loop control system, which has a turbine speed controller that determines a second correcting variable (SG2) for influencing the flow-through turbine cross section (AT) from a deviation (dnT) of an actual turbine speed value from a set turbine value, the second closed-loop control system being subordinate to the first closed-loop control system, and a reference input of the second closed-loop control system being determined from the first correcting variable (SG1), including computing a third correcting variable (SG3) for synchronizing the first exhaust gas turbocharger and a second exhaust gas turbocharger, by means of an end of tape control block.

8. The method in accordance with claim 7, wherein the flow-through turbine cross section of the first exhaust gas turbocharger is substantially determined by the second correcting variable (SG2) and the third correcting variable (SG3).

9. The method in accordance with claim 7, including determining the turbine actual speed (nT(IST)) for the second closed-loop control system from a maximum turbine speed of the first exhaust gas turbocharger or the second exhaust gas turbocharger.

10. A device for closed-loop control of at least a first exhaust gas turbocharger with variable turbine geometry, comprising: a first closed-loop control system for automatically controlling charge air pressure by means of a charge air pressure controller, which determines a first correcting variable (SG1) for influencing a flow-through turbine cross section from a deviation (dpLL) of an actual charge air pressure value from a set charge air pressure value; and a second closed-loop control system for automatically controlling turbine speed by means of a turbine speed controller, which determines a second correcting variable (SG2) for influencing the flow-through turbine cross section from a deviation (dnT) of an actual turbine speed from a set turbine speed, the second closed-loop control system being subordinate to the first closed-loop control system, and the first correcting variable (SG1) corresponding to a reference input of the second closed-loop control system, and further comprising a first input-output map (KF1) for computing a first set charge air pressure, a second input-output map (KF2) for computing a second set charge air pressure, and a switch for selecting the first input-output map (KF1) or the second input-output map (KF2) for determining the reference input of the first closed-loop control system.

11. A device for closed-loop control of at least a first exhaust gas turbocharger with variable turbine geometry, comprising: a first closed-loop control system for automatically controlling charge air pressure by means of a charge air pressure controller, which determines a first correcting variable (SG1) for influencing a flow-through turbine cross section from a deviation (dpLL) of an actual charge air pressure value from a set charge air pressure value; and a second closed-loop control system for automatically controlling turbine speed by means of a turbine speed controller, which determines a second correcting variable (SG2) for influencing the flow-through turbine cross section from a deviation (dnT) of an actual turbine speed from a set turbine speed, the second closed-loop control system being subordinate to the first closed-loop control system, and the first correcting variable (SG1) corresponding to a reference input of the second closed-loop control system, and further comprising a first synchronization controller for synchronizing the first exhaust gas turbocharger and a second exhaust gas turbocharger with variable turbine geometry by means of a third correcting variable (SG3).

12. The device in accordance with claim 11, wherein an input variable of the first synchronization controller corresponds to a difference (DIFF) between turbine speeds (nT1, nT2) of the first exhaust gas turbocharger and the second exhaust gas turbocharger.

13. The device in accordance with claim 11, wherein the third correcting variable (SG3) and the second correcting variable (SG2) are the input variables of the first exhaust gas turbocharger.

14. The device in accordance with claim 11, and further comprising a maximum value selector (MAX) for determining turbine actual speed (nT(IST)) from turbine speeds (nT1, nT2) of the first exhaust gas turbocharger and the second exhaust gas turbocharger.

15. A device for closed-loop control of at least a first exhaust gas turbocharger with variable turbine geometry, comprising: a first closed-loop control system for automatically controlling charge air pressure by means of a charge air pressure controller, which determines a first correcting variable (SG1) for influencing a flow-through turbine cross section from a deviation (dpLL) of an actual charge air pressure value from a set charge air pressure value; and a second closed-loop control system for automatically controlling turbine speed by means of a turbine speed controller, which determines a second correcting variable (SG2) for influencing the flow-through turbine cross section from a deviation (dnT) of an actual turbine speed from a set turbine speed, the second closed-loop control system being subordinate to the first closed-loop control system, and the first correcting variable (SG1) corresponding to a reference input of the second closed-loop control system, and further comprising a second synchronization controller for synchronizing the first exhaust gas turbocharger and a second exhaust gas turbocharger with variable turbine geometry by means of a third correcting variable (SG3).

16. The device in accordance with claim 15, wherein an input variable of the second synchronization controller corresponds to a difference (DIFF) between the air masses (LM1, LM2) of the first exhaust gas turbocharger and the second exhaust gas turbocharger.

17. The device in accordance with claim 15, wherein the third correcting variable (SG3) and the second correcting variable (SG2) are the input variables of the first exhaust gas turbocharger.

18. The device in accordance with claim 15, and further comprising a maximum value selector (MAX) for determining turbine actual speed (nT(IST)) from turbine speeds (nT1, nT2) of the first exhaust gas turbocharger and the second exhaust gas turbocharger.

19. A device for closed-loop control of at least a first exhaust gas turbocharger with variable turbine geometry, comprising: a first closed-loop control system for automatically controlling charge air pressure by means of a charge air pressure controller, which determines a first correcting variable (SG1) for influencing a flow-through turbine cross section from a deviation (dpLL) of an actual charge air pressure value from a set charge air pressure value; and a second closed-loop control system for automatically controlling turbine speed by means of a turbine speed controller, which determines a second correcting variable (SG2) for influencing the flow-through turbine cross section from a deviation (dnT) of an actual turbine speed from a set turbine speed, the second closed-loop control system being subordinate to the first closed-loop control system, and the first correcting variable (SG1) corresponding to a reference input of the second closed-loop control system, and further comprising an end of tape control block for synchronizing the first exhaust gas turbocharger and a second exhaust gas turbocharger with variable turbine geometry by means of a third correcting variable (SG3).

20. The device in accordance with claim 19, wherein the third correcting variable (SG3) and the second correcting variable (SG2) are the input variables of the first exhaust gas turbocharger.

21. The device in accordance with claim 19, and further comprising a maximum value selector (MAX) for determining turbine actual speed (nT(IST)) from turbine speeds (nT1, nT2) of the first exhaust gas turbocharger and the second exhaust gas turbocharger.

22. A device for closed-loop control of at least a first exhaust gas turbocharger with variable turbine geometry, comprising: a first closed-loop control system for automatically controlling charge air pressure by means of a charge air pressure controller, which determines a first correcting variable (SG1) for influencing a flow-through turbine cross section from a deviation (dpLL) of an actual charge air pressure value from a set charge air pressure value; and a second closed-loop control system for automatically controlling turbine speed by means of a turbine speed controller, which determines a second correcting variable (SG2) for influencing the flow-through turbine cross section from a deviation (dnT) of an actual turbine speed from a set turbine speed, the second closed-loop control system being subordinate to the first closed-loop control system, and the first correcting variable (SG1) corresponding to a reference input of the second closed-loop control system, wherein the charge air pressure controller comprises a PI controller, an input-output map input control, a functional block for computing a maximum turbine speed (nTMAX), a functional block for determining a maximum amplitude (AMP), a minimum value selector (MIN), and a functional block for limiting an I component.

23. A method for closed-loop control of at least a first exhaust gas turbocharger with variable turbine geometry, comprising the steps of: automatically controlling charge air pressure by means of a first closed-loop control system, which has a charge air pressure controller that determines a first correcting variable (SG1) for influencing a flow-through turbine cross section from a deviation (dpLL) of an actual charge air pressure value from a set charge air pressure value; and automatically controlling turbine speed by means of a second closed-loop control system, which has a turbine speed controller that determines a second correcting variable (SG2) for influencing the flow-through turbine cross section (AT) from a deviation (dnT) of an actual turbine speed value from a set turbine value, the second closed-loop control system being subordinate to the first closed-loop control system, and a reference input of the second closed-loop control system being determined from the first correcting variable (SG1), including determining a reference input of the first closed-loop control system by means of a first input-output map (KF1) or a second input-output map (KF2), including computing the first correcting variable (SG1) by means of a device in accordance with claim 22.

24. A device for closed-loop control of at least a first exhaust gas turbocharger with variable turbine geometry, comprising: a first closed-loop control system for automatically controlling charge air pressure by means of a charge air pressure controller, which determines a first correcting variable (SG1) for influencing a flow-through turbine cross section from a deviation (dpLL) of an actual charge air pressure value from a set charge air pressure value; and a second closed-loop control system for automatically controlling turbine speed by means of a turbine speed controller, which determines a second correcting variable (SG2) for influencing the flow-through turbine cross section from a deviation (dnT) of an actual turbine speed from a set turbine speed, the second closed-loop control system being subordinate to the first closed-loop control system, and the first correcting variable (SG1) corresponding to a reference input of the second closed-loop control system, wherein the turbine speed controller comprises a PI controller, a functional block for limiting the I component, a DT1 input control, a charge air pressure input control, a surge protection input-output map, and a functional block for determining a maximum flow-through turbine cross section (ATMAX).

25. A method for closed-loop control of at least a first exhaust gas turbocharger with variable turbine geometry, comprising the steps of: automatically controlling charge air pressure by means of a first closed-loop control system, which has a charge air pressure controller that determines a first correcting variable (SG1) for influencing a flow-through turbine cross section from a deviation (dpLL) of an actual charge air pressure value from a set charge air pressure value; and automatically controlling turbine speed by means of a second closed-loop control system, which has a turbine speed controller that determines a second correcting variable (SG2) for influencing the flow-through turbine cross section (AT) from a deviation (dnT) of an actual turbine speed value from a set turbine value, the second closed-loop control system being subordinate to the first closed-loop control system, and a reference input of the second closed-loop control system being determined from the first correcting variable (SG1), including determining a reference input of the first closed-loop control system by means of a first input-output map (KF1) or a second input-output map (KF2), including computing the second correcting variable (SG2) by means of a device in accordance with claim 24.

\* \* \* \* \*